United States Patent Office 3,554,694
Patented Jan. 12, 1971

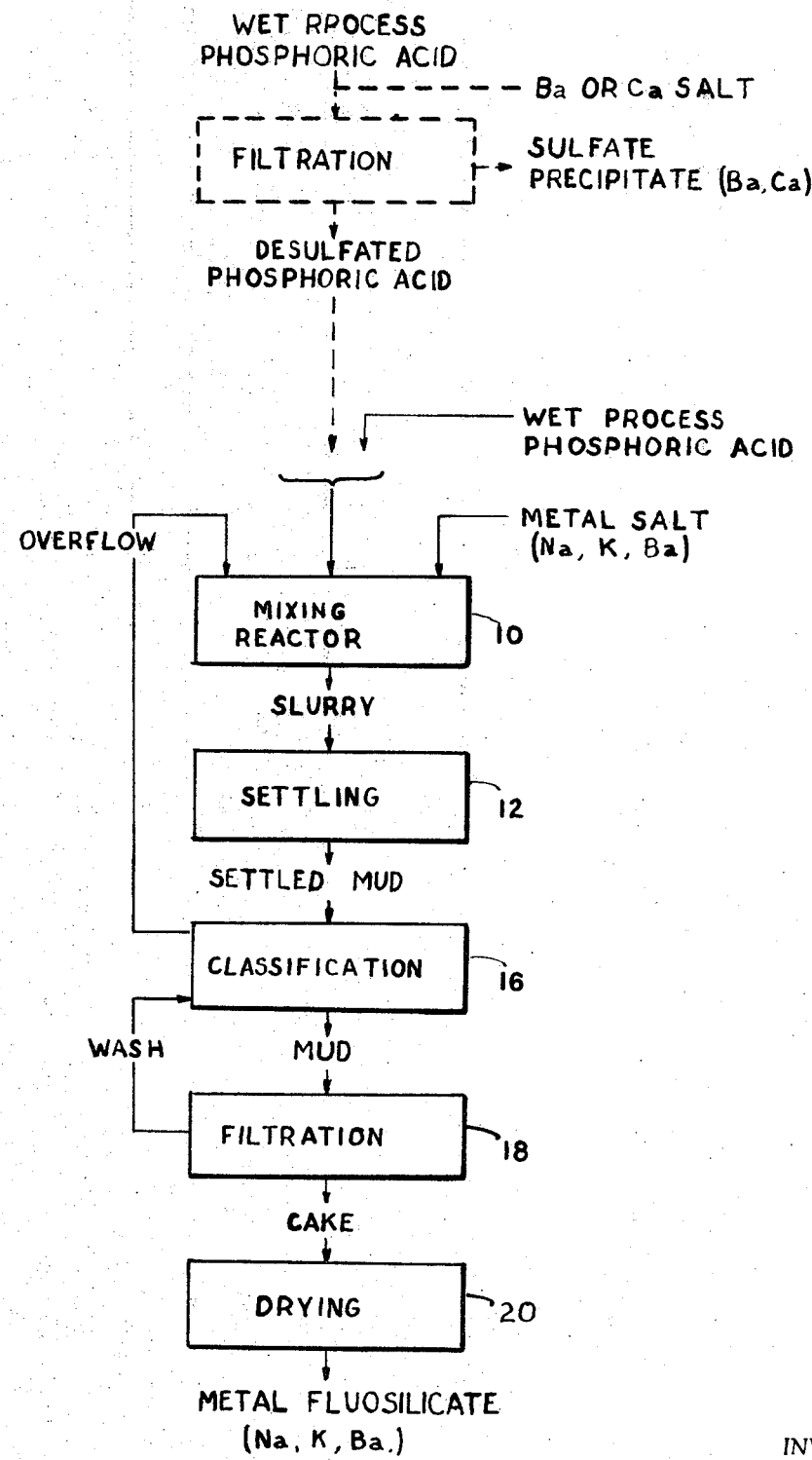

3,554,694
PROCESS FOR PRODUCING FLUOSILICATES
James E. Barker, Freehold, N.J., and Julian H. Robinson, Lithia Springs, Ga., assignors to Cities Service Company, New York, N.Y., a corporation of Delaware
Continuation-in-part of application Ser. No. 656,279, July 26, 1967. This application June 2, 1969, Ser. No. 829,344
The portion of the term of the patent subsequent to Aug. 19, 1986, has been disclaimed
Int. Cl. C01d 3/02; C01f 11/22
U.S. Cl. 23—88
13 Claims

ABSTRACT OF THE DISCLOSURE

A process for the manufacture of commercially pure sodium fluosilicate from wet process phosphoric acid (WPA) by reacting a sodium salt preferably sodium chloride with the fluosilicic acid present in the phosphoric acid under conditions of moderate agitation characterized by a Reynolds number of between 7600 and 8300, thereby precipitating the sodium fluosilicates as a particle having a size between 200 mesh and 325 mesh. The reactant containing the precipitate is discharged as a slurry to a settling tank where the precipitate is settled out and the clarified defluorinated acid passed out in a separate stream for further processing. The settled mud is then passed to a classifier where gypsum and other solids are floated out in the wash, the wash as overflow being recycled to the mixing reactor. The classified sodium ffuosilicate is filtered and dried to obtain a commercially pure sodiumfluosilicate.

Wet process phosphoric acid can also be defluorinated by reaction with either potassium or barium salts under like conditions. In the instance, either potassium or barium fluosilicate may be recovered. By reacting the wet acid with a mixture of sodium, potassium and/or barium salts, a mixed fluosilicate product can also be obtained.

REFERENCE TO RELATED APPLICATION

This application is a continuation-in-part of applicants' co-pending application Ser. No. 656,279, filed July 26, 1967, now Pat. No. 3,462,242, entitled "Process for Producing Fluosilicates" and assigned to the assignee of the present application.

BACKGROUND OF THE INVENTION

This invention relates to a process for producing commercially pure sodium fluosilicate by defluorinating phosphoric acid produced by the acidulation of phosphate rock and similar fluoride containing phosphate materials. Sodium fluosilicate is used in the manufacture of vitreous enamels and opalescent glass as a coagulant for latex and in the fluoridation of drinking water, provided it meets requisite purity and size standards.

Wet process phosphoric acid (WPA) is produced by the acidulation of naturally occurring phosphate materials, such as phosphate rock which ordinarily contains about 4% by weight of combined fluorine. The presence of the fluorine in the phosphoric acid makes such acid unsuitable and undesirable for many purposes such as manufacture of high quality fertilizers or animal food supplements. Accordingly, it is necessary to defluorinate such wet process phosphoric acid before it can be used in manufacturing fertilizers and animal food supplements.

A number of processes for defluorinating the phosphoric acid have been developed and include precipitation and filtration of the fluorides, steam or air stripping of the fluorides and simple concentration of the acid in the course of which the volatile fluorides are evolved. All these prior art defluorination processes are expensive or wasteful of phosphorous or both. In the present practice about half the fluorine is volatilized as $SiF_4$ by concentrating the primary acid to the final merchant grade. This $SiF_4$ is collected and converted to fluosilicic acid by scrubbing the volatized gases with water. The resulting dilute fluosilicic acid is reacted with an alkali metal hydroxide to primary acid to precipitate the alkali metal fluosilicate. However, in the latter method, the resulting alkali fluosilicate is contaminated with gypsum and other insoluble materials from the acid, and requires subsequent purification by digesting the soluble materials with fluosilicic acid as outlined in U.S. Pat. 3,055,733. Additionally, in practicing the ordinary alkali precipitation of the fluorine from the wet process phosphoric acid, the acid is neutralized to a considerable extent producing unwanted sodium phosphate. To keep the formation of sodium phosphate down to a minimum, an amount of alkali is added to the wet process phosphoric acid in quantities sufficient to precipitate substantially all the fluosilicate. This precipitate as obtained by prior art techniques is unsatisfactory because it is extremely difficult to separate from the acid as it is extremely gelatinous and has a low rate of crystal growth and a slow settling rate.

SUMMARY OF THE INVENTION

We have discovered that sodium fluosilicate can be separated from the other insoluble materials obtained by the reaction of a sodium salt, preferably sodium chloride, with a fluosilicate containing phosphoric acid, by agitating the salt and acid reactants at lower than normal mixing conditions chracterized by a Reynolds number between 7600 and 8300 whereby the sodium fluosilicate is precipitated in such a manner that the crystals are both larger than 325 mesh and readily separable from any included impurities. Where more severe agitation characterized by a Reynolds number higher than 8300 is used, the particles tend to be smaller than 325 mesh and a gelling with other precipitated material takes place. Agitation characterized by a Reynolds number lower than 7600 is insufficient to obtain satisfactory crystal size formation. In a particular embodiment, the process comprises the steps of adding sodium salt to wet process phosphoric acid containing fluosilicates under the aforesaid agitation to precipitate sodium fluosilicate having a crystal size between about 200 mesh and 325 mesh, separating the precipitate from the liquor by clarification, removing insoluble materials other than sodium fluosilicate from the precipitate by water classification and filtering and drying the sodium fluosilicate.

Potassium fluosilicate and barium fluosilicate can likewise be recovered by adding either a potassium salt or a barium salt to wet process phosphoric acid or other fluorine-containing phosphoric acid and agitating the reaction mixture under mixing conditions characterized by a Reynolds number between about 7600 and 8300. The potassium or barium fluosilicate is precipitated in such a manner that the crystals thereof are both larger than 325 mesh and readily separable from various insoluble impurities that may be included in the acid. The potassium or barium fluosilicate and other insoluble materials can readily be separated from the thus defluorinated acid by clarification, as in a settling zone. When pure barium fluosilicate is to be recovered from a sulfate-containing acid, however, a preliminary addition of the barium salt may be made in order to precipitate the sulfate, which may then be removed from the acid by conventional techniques. An additional quantity of barium salt is thereafter added to the desulfated acid under the conditions indicated above to precipitate barium fluosilicate. The potassium or barium fluosilicate separated from the defluorinated acid can thereafter be separated from other insoluble materials by suitable classification techniques. The fluosilicate product is then recovered by filtering and drying the thus separated potassium or barium fluosilicate. If desired, a mixture of sodium, potassium and/or barium salts may be employed in order to recover a mixed fluosilicate product.

Therefore, it is an object of this invention to provide a process for the production of commercially pure sodium fluosilicates.

It is another object of this invention to provide an efficient, inexpensive process for removing fluorides from wet process phosphoric acid.

It is a further object of this invention to provide a process for the production of potassium and barium fluosilicates.

Other objects and advantages of the process of this invention will become apparent from the description of the preferred embodiments and examples which follow:

BRIEF DESCRIPTION OF THE DRAWINGS

The drawing is a flow diagram showing the process of this invention.

BRIEF DESCRIPTION OF THE PREFERRED EMBODIMENTS

Referring to the drawing, wet process phosphoric acid is fed from a source not shown into a reactor 10 together with sodium chloride from a separate source also not shown. While sodium chloride is preferred, other salts or bases such as sodium carbonate, phosphate and sulfate or sodium hydroxide are contemplated on an equivalent sodium basis.

The sodium chloride is added either as a solid crystal or as an aqueous solution to the liquid reactant in the reactor while the reactant is continually but moderately agitated, stirred or mixed by conventional means provided that the agitation is characterized by a Reynolds number of from about 7600 to about 8300.

Such mixing is neither fully turbulent nor laminar, as fully turbulent mixing is characterized by a Reynolds number greater than about 10,000 and laminar mixing characterized by a Reynolds number below 10. Most mixing is performed in the fully turbulent-range and as such is neither characteristic of the present invention, nor would the same results be obtained. The Reynolds number may be determined utilizing the equation:

$$N_{Re} = \frac{N D a^2 P}{U}$$

where N is the mixing impellers speed, $Da$ is the impeller diameter, P is the fluid density, and U is the absolute viscosity.

Any conventional mixing apparatus may be used provided the mixer speed is controlled to obtain the specified mixing characterized by a Reynolds number between 7600 and 8300 as defined by the above equation. Where the agitation is characterized by a Reynolds number below 7600, there is insufficient and inadequate mixing of the reactants. Alternatively, where the agitation is above about that characterized by a Reynolds number of 8300, it was found that the particle size was smaller than 325 mesh and that other precipitated impurities tended to cause difficulty during subsequent separation and additionally slowed the settling rate. This is so since the precipitate when mixed at a more severe rate is extremely gelatinous and tends to trap foreign material or gangue, so that it is extremely difficult to filter and purify.

The temperature maintained during mixing is generally in the range of from about 100° F. to about 200° F., with a range of from about 140° F. to about 160° F. being preferred. The mixture is retained in the reactor 10 for a period of from about 5 minutes to about 30 minutes. The longer periods are used where a lower mixing temperature is employed and in those instances where sodium phosphate is present in the reactor.

Commercially pure sodium chloride NaCl either as solid or as brine is added to the impure wet process phosphoric acid from about 50% of the stoichiometrical amount to about 150% of that amount, though an amount of salt equivalent to from about 100% to about 150% of the stoichiometrical amount based upon the fluosilicates present is preferred.

The resultant slurry containing precipitated sodium fluosilicate is passed from the reactor 10 to a settling tank 12 and retained for a period of from 15 to 60 minutes, 15 minutes being preferred, where the sodium fluosilicate precipitate is caused to settle in the tank 12 while the clarified liquor consisting of substantially defluorinated wet process phosphoric acid supernatant is drawn off for subsequent treatment. The volume and cross-sectional area of the settling tank are selected to be sufficient to achieve a separation of the sodium fluosilicate precipitate at the settling velocity over the desired period of time. The defluorinated phosphoric acid supernatant liquid is removed from the tank for further processing such as the manufacture of fertilizers.

The settled mud is passed to a classifier 16 where it is treated with an aqueous liquor as a wash. Wet classification is generally defined as the separating of solid particles in a mixture of solids, such as the settled mud, into fractions according to particle size or density by methods other than screening. In general, the two products are a partially drained fraction containing the coarse material and a fine fraction along with the liquid medium designated as overflow. The coarse material in this instance is the sodium fluosilicate while gypsum and other impurities are the fine fraction which is floated out in the wash liquor as part of the overflow. In an illustrative embodiment a chromatograph column is used as the classifier and wash liquor is supplied at the column bottom to obtain a sufficient upward flow velocity in the column to separate the sodium fluosilicate from the other solid impurities.

The overflow from the classifier 16 is recycled back to the reactor 10. The sodium fluosilicate mud from the classifier is passed to a filter 18 where it is separated out as a filter cake and filtrate is recycled back to the classifier to serve as the wash liquor. Additional water is added to makeup to the classified sodium fluosilicate mud during filtration to provide sufficient filtrate to act as wash liquor.

The filter cake is dried in a dryer 20 and receved as the commercially pure sodium fluosilicate product.

Up to 85% of the total fluorine in the wet process phosphoric acid can be recovered as sodium fluosilicate. This represents a 99+% recovery of available fluosilicate as the remaining fluorine is present in an unrecoverable aluminum difluoride complex $AlF_2+$. The aluminum defluoride complex remains in solution in the defluorinated phosphoric acid supernatant which is separated from the settled sodium fluosilicate mud.

In another aspect of this invention, wet process phosphoric acid or other impure acid containing fluorides and silicates may be defluorinated by reaction with either a potassium or a barium salt. In this manner, potassium or barium fluosilicate may be obtained in place of the sodium fluosilicate indicated above. The operating conditions employed in the preparation of potassium and barium fluosilicates are the same as those set forth herein with respect to the production of sodium fluosilicate. That is, the reaction mixture of impure acid and potassium or barium compound is agitated under mixing conditions characterized by a Reynolds number of from about 7600 to about 8300 in order to obtain a particle size larger than 325 mesh slurried in a phosphoric acid liquor.

The product potassium or barium fluosilicate is separated from the phosphoric acid liquor by any suitable clarification technique. For example, a settling tank such as that shown in the drawing may readily be employed. The clarified liquor consisting of substantially defluorinated wet acid supernatant is drawn off for subsequent treatment or use in accordance with conventional techniques forming no part of this invention.

The settled mud removed from the settling tank is passed to a classification unit, as represented by classifier 16 of the drawing, in which the potassium or barium fluosilicate is separated from insoluble impurities present in the settled mud. When a chromatograph column is used as the classifier and wash liquor is supplied at the bottom of the column at a sufficient upward velocity, the coarse material, i.e. the potassium or barium fluosilicate, may be separated from the fine fraction, containing the other impurities, that is floated out in the wash liquor as part of the overflow. This overflow may be recycled back to the reactor as also shown in the drawing.

The potassium or barium fluosilicate mud from the classifier may be passed to a filter, e.g. filter 18 of the drawing, where it is separated out as a filter cake. The resulting filtrate may be recycled back to the classifier as wash liquor. The filter cake is dried, as in dryer 20, and is removed as products suitable for the glass industry and other known purposes.

When pure barium fluosilicate is to be recovered from a sulfate-containing acid, the sulfate, e.g. gypsum, must be removed from the acid prior to the formation of the barium fluosilicate product so that the sulfate will not be removed with the desired product. This may be accomplished by using a suitable separation technique to remove insoluble sulfates prior to the addition of the barium salt. A centrifuge, hydrocyclone, thickener or filter can be employed for this purpose. In one embodiment, a portion of the barium salt is added to the sulfate-containing acid to precipitate the sulfate therein as barium sulfate in a preliminary operation. The barium sulfate precipitate is easily separated from the wet acid by filtering or other suitable means. The rest of the barium salt is then added to the desulfated acid to precipitate barium fluosilicate as indicated above. In another embodiment of the invention, phosphate rock has been added to the impure acid in order to precipitate the sulfate.

In the practice of this invention, any suitable potassium and barium salts soluble in the reaction mixture may be employed. The chloride, phosphate, sulfate, and hydroxide salts of potassium and barium are examples of salts that are suitable for use in this invention.

The clarification and classification operations set forth herein may be carried out in any convenient equipment, the details of which are not essential features of the invention. Thus, any suitable settling chamber or thickener may be employed in separating the defluorinated acid from the fluosilicate-containing mud. Likewise, a centrifuge, hydrocyclone or other classification vessel can be employed in place of the chromatograph column referred to above.

In addition to the separation and recovery of a pure sodium, potassium or barium fluosilicate product, it is also within the scope of the invention to add a mixture of sodium, potassium and/or barium salts, or any combination thereof, in order to obtain a mixed fluosilicate product having the desired sodium, potassium or barium components contained therein.

As when a sodium salt is employed, the potassium or barium salt may be added to the impure acid in any desired amount generally within the range of from about 50% to about 150% of the stoichiometric amount necessary for reaction with the fluorine content of the impure phosphoric and containing fluorides and silicates. An amount within the range of from about 100% to about 150% of the stoichiometric amount is generally preferred. When a preliminary addition of barium salt is employed to precipitate the sulfate content of the acid is employed, the amount of barium salt employed for this purpose will generally be within this same range with respect to the soichiometric amount of barium required for precipitation of the sulfate. Operating conditions, such as temperature, retention time and the like are as set forth above with respect to the production of sodium fluosilicate.

In order to further describe the invention and without any intention of being limited thereto, the following examples are given:

EXAMPLE 1

Two thousand pounds (2,000 lbs.) of wet process phosphoric acid, comprising by weight 29% $P_2O_5$, 2.4% and 68.6% water was fed into the reactor simultaneously with 63.6 lbs. of salt (NaCl) and 219.5 lbs. of recycled overflow wash liquor from the classifier, all the while being subject to a mixing characterized by a Reynolds number between 7600 and 8300. In the settling tank, the reaction product was retained for a period of about 15 minutes exhibiting a settling rate of 6 inch/minute and yielding 2103 lbs. of defluorinated phosphoric acid, and 180 lbs. of settled mud. The defluorinated phosphoric acid analyzed as follows by weight:

| | Percent |
|---|---|
| $P_2O_5$ | 27.6 |
| F | 0.57 |
| HCl | 1.06 |
| NaCl | 1.27 |
| $H_2O$ | 69.5 |

The settled mud analyzed as follows:

| | Percent |
|---|---|
| $Na_2SiF_6$ | 35 |
| $P_2O_5$ | 17.9 |
| HCl | 0.7 |
| NaCl | 0.8 |
| $H_2O$ | 45.2 |
| Insol. including gypsum | 0.1 |

The settled mud was passed into a chromatography column acting as the classifier with about 173 lbs. of wash liquor supplied at the column bottom having a 3 in./minute flow at the ratio of 4 lbs. wash per lb. of sodium fluosilicate ($Na_2SiF_6$). At the conclusion of classification the classified mud was composed of 132 lbs. of the following by weight:

| | Percent |
|---|---|
| $Na_2SiF_6$ | 45 |
| $P_2O_5$ (soluble) | 4.9 |
| HCl | 0.2 |
| NaCl | 0.2 |
| $H_2O$ | 49.6 |
| Insolubles | 0.005 |

The overflow from the classifier was recycled as shown in the drawing to the reactor. The classified mud was passed through the filter at the rate of 1600 gal./hr./ft.² under 15″ Hg vacuum. The filtrate was recycled to the classifier as wash liquor while the filter cake was passed through a dryer and resulted in 59.4 lbs. of sodium fluosilicate of 99.4% purity.

EXAMPLE 2

The recovery of fluosilicate as the commercially pure sodium fluosilicate shown above is dependent on the proportion of salt added to the wet process phosphoric acid.

This is indicated by the various tests utilizing the process as described in Example 1 but varying the quantity of salt (NaCl) added. Results are summarized in the following table:

| NaCl percent of stoichiometric requirement | Percent SiF$_4$ recovery | WPA analysis | |
|---|---|---|---|
| | | F (percent) | Na (percent) |
| 66.7 | 71.5 | 0.99 | 0.090 |
| 77.4 | 82.4 | 0.78 | 0.110 |
| 87.9 | 88.6 | 0.62 | 0.131 |
| 98.6 | 94.9 | 0.48 | 0.206 |
| 110.9 | 99.9 | 0.37 | 0.286 |

EXAMPLE 3

Primary wet process phosphoric acid containing 29.76% P$_2$O$_5$ and 2.05% fluorine was fed into a reactor simultaneously with a solution of KCl in recycled wash liquor. The recycle liquor contained 180 g.p.l. KCl and was fed at a rate of 601 pounds of KCl per ton of wet process phosphoric acid. Agitation in the reactor was characterized by a Reynolds number between 7600 and 8300. The average temperature and retention time in the reactor were 1 hour and 140° F., respectively. The product K$_2$SiF$_6$ settled from the acid at about 6" per minute. The settled product slurry was separated and placed in a classification column. Water was then introduced into the bottom of the column at such a rate that the upward velocity was about 4" per minute. In this manner, the organic material and the gypsum which would normally contaminate the product were separated from it. The overflow liquor from a previous run was the source of recycle wash liquor used in the precipitation. The product after classification was filtered, washed and dried, resulting in the recovery of 63.6 pounds of potassium fluosilicate of 98% purity per ton of phosphoric acid fed. This accounted to a recovery of 78.9% of the fluorine content of the wet acid.

EXAMPLE 4

This run was the same as Example 3, except that 275 pounds of barium chloride per ton of feed acid, as a solution of 300 grams per liter in recycle wash liquor, was used as a precipitant. The resulting slurry was filtered, washed and dried. The filter cake contained 41.8% barium fluosilicate and 56.9% barium sulfate. The resulting acid was essentially sulfate free and the fluorine content had been reduced to 6% of the original.

EXAMPLE 5

This run was essentially the same as that of Example 4, except that the barium chloride was added in two portions. The first 125 pounds of barium chloride per ton of acid was added primarily to precipitate the sulfate, which was removed by filtration. The desulfated acid was then treated with the remaining 150 pounds of barium chloride per ton of acid to precipitate 79.4 lbs. of 98.5% pure barium fluosilicate.

EXAMPLE 6

This run was the same as Example 5, except that 145 pounds of 68 BPL phosphate rock per ton of acid was reacted with the acid to precipitate the sulfur as calcium sulfate. This precipitate was removed by filtration. The filtrate was then treated with 150 pounds of barium chloride per ton of acid to produce 97.2 pounds of 89% pure barium fluosilicate.

The present invention provides a convenient means for obtaining a defluoroinated phosphoric acid from an impure acid containing fluorides and silicates. The defluorinated acid may therafter be concentrated without encountering the serious air and water pollution problems that otherwise would arise due to the evolution of fluorine and its collection as dilute fluosilicic acid in wet scrubber systems. In addition, the processes herein described permit the recovery, as marketable by-products, of sodium fluosilicate, potassium fluosilicate, barium fluosilicate and, if desired, mixtures of these products.

While the invention has ben described herein with respect to particular embodiments thereof, it will be appreciated by those skilled in the art that various changes and modifications can be made without departing from the scope of the invention as set forth in the appended claims.

Therefore, we claim:

1. A process for producing fluosilicates from impure phosphoric acid containing fluorides and silicates comprising:
   (a) feeding the impure phosphoric acid and a compound soluble therein and taken from the group consisting of a potassium compound, a barium compound and mixtures thereof, into a reaction vessel;
   (b) agitating the impure phosphoric acid and said compound under mixing conditions characterized by a Reynolds number of from about 7600 to about 8300 in order to obtain a particulate fluosilicate precipitate characterized by a particle size larger than 325 mesh slurried in a phosphoric acid liquor; and
   (c) separating the fluosilicate precipate from the phosphoric acid liquor, whereby the desired fluosilicate product is obtained and the impure acid is substantially defluorinated so as to minimize the water and air pollution effects arising from the presence of volatile fluorine in the acid upon concentration thereof.

2. The process of claim 1 in which the soluble compound is a potassium compound.

3. The process of claim 2 in which the potassium compound is potassium chloride.

4. The process of claim 1 in which the soluble compound is a barium compound.

5. The process of claim 4 in which the barium compound is barium chloride.

6. The process of claim 1 in which said fluosilicate precipitate is separated from the acid liquor through clarification by allowing the fluosilicate precipitate to settle as a fluosilicate mud while removing the supernatant phosphoric acid liquor and including:
   (a) classifying the settled mud with aqueous wash liquor to remove solid impurities in an overflow and to obtain a thus-purified fluosilicate product; and
   (b) filtering the classified fluosilicate product to obtain a filtrate and the desired fluosilicate product.

7. The process of claim 1 in which the agitation of the impure acid and the soluble compound is such as to produce a fluosilicate product characterized by a particle size of between 325 mesh and 200 mesh.

8. The process of claim 1 and including the feeding of a sodium compound to said reaction vessel, whereby the fluosilicate precipitate obtained will comprise a mixture of sodium fluosilicate with potassium fluosilicate and/or barium fluosilicate.

9. The process of claim 6 in which the soluble compound is a barium compound other than barium sulfate and the impure acid is one containing sulfate impurities and including the separating of said sulfate from the acid prior to the addition of the barium compound used for precipitating barium fluosilicate, whereby the formation of barium sulfate is avoided and substantially pure barium fluosilicate may be obtained.

10. The process of claim 9 in which the sulfate impurities are removed from the acid by adding a barium compound other than barium sulfate to the acid and thereafter separating the resulting barium sulfate precipitate from the acid prior to the addition of the barium compound used to precipitate the desired barium fluosilicate product.

11. The process of claim 9 in which the sulfate impurities are removed from the acid by adding a calcium-containing compound to the acid and therafter separating the resulting calcium sulfate precipitate from the acid prior to the addition of the barium compound used to precipitate the desired barium fluosilicate product.

12. The process of claim 11 in which said calcium-containing compound comprises phosphate rock.

13. The process of claim 10 in which the barium sulfate is separated from the acid by filtering the reaction mixture of impure acid and said barium compound, whereby a desulfated acid filtrate is obtained suitable for agitation with said barium compound other than barium sulfate to produce the desired barium fluosilicate product.

References Cited

UNITED STATES PATENTS

| | | | |
|---|---|---|---|
| 2,865,709 | 12/1958 | Horn et al. | 23—88 |
| 2,883,266 | 4/1959 | Hodges et al. | 23—88 |
| 3,462,242 | 8/1969 | Barker et al. | 23—88 |

EDWARD STERN, Primary Examiner

U.S. Cl. X.R.

23—122, 165